(12) United States Patent
Osztroluczki et al.

(10) Patent No.: US 8,938,107 B2
(45) Date of Patent: Jan. 20, 2015

(54) SYSTEM AND METHOD FOR AUTOMATIC SEGMENTATION OF ORGANS ON MR IMAGES USING A COMBINED ORGAN AND BONE ATLAS

(75) Inventors: Andras Osztroluczki, Szeged (HU); Gabor Novak, Szeged (HU); Milan Redele, Varpalota (HU); Marta Fidrich, Szeged (HU)

(73) Assignee: General Electric Company, Schenectady, NY (US)

( * ) Notice: Subject to any disclaimer, the term of this patent is extended or adjusted under 35 U.S.C. 154(b) by 514 days.

(21) Appl. No.: 13/297,664

(22) Filed: Nov. 16, 2011

(65) Prior Publication Data

US 2013/0121552 A1    May 16, 2013

(51) Int. Cl.
*G06K 9/00*    (2006.01)
*G06T 7/00*    (2006.01)

(52) U.S. Cl.
CPC ..... *G06T 7/0081* (2013.01); *G06T 2207/10081* (2013.01); *G06T 2207/10088* (2013.01); *G06T 2207/20128* (2013.01); *G06T 2207/30008* (2013.01)
USPC ........................................................ 382/131

(58) Field of Classification Search
None
See application file for complete search history.

(56) References Cited

U.S. PATENT DOCUMENTS

| | | | |
|---|---|---|---|
| 6,249,594 B1 * | 6/2001 | Hibbard | 382/128 |
| 6,466,813 B1 | 10/2002 | Shukla et al. | |
| 8,374,414 B2 * | 2/2013 | Tang et al. | 382/131 |
| 2003/0093004 A1 * | 5/2003 | Sosa et al. | 600/544 |
| 2009/0220136 A1 * | 9/2009 | Bova et al. | 382/131 |
| 2010/0296718 A1 * | 11/2010 | Ostrovsky-Berman et al. | 382/133 |
| 2012/0197104 A1 * | 8/2012 | Posse et al. | 600/410 |
| 2013/0121552 A1 * | 5/2013 | Osztroluczki et al. | 382/131 |

OTHER PUBLICATIONS

Dowling et al., Automatic atlas-based segmentation of the prostate: A MICCAI 2009 Prostate Segmentation Challenge entry, London, UK, 2009, 8 pages.
Klein, Automatic segmentation of the prostate in 3D MR images by atlas matching using localized mutual information, Med. Phys. vol. 35, No. 4, Apr. 2008, pp. 1407-1417.
Pasquier et al., Automatic Segmentation of Pelvic Structures From Magnetic Resonance Images for Prostate Cancer Radiotherapy, I. J. Radiation Oncology, Biology, Physics, vol. 68, No. 2, 2007, pp. 592-600.

* cited by examiner

*Primary Examiner* — Tahmina Ansari
(74) *Attorney, Agent, or Firm* — Dean D. Small; The Small Patent Law Group

(57) ABSTRACT

A method for segmenting organs on magnetic resonance (MR) images includes retrieving an MR image of a subject and generating a transformation matrix by segmenting bones on the MR image. An initial organ segmentation of the MR image is generated by registering a combined organ and bone atlas with the MR image using the transformation matrix. The MR image with initial organ segmentation may be shown on a display.

26 Claims, 5 Drawing Sheets

US 8,938,107 B2

SYSTEM AND METHOD FOR AUTOMATIC SEGMENTATION OF ORGANS ON MR IMAGES USING A COMBINED ORGAN AND BONE ATLAS

TECHNICAL FIELD

The present invention relates generally to magnetic resonance imaging (MRI) systems and in particular, to an atlas-based system and method for automatically segmenting organs in MR images.

BACKGROUND

During clinical diagnosis, the internal anatomy of a patient is imaged to determine how a certain disease has progressed. For example, the images may be used to help distinguish between infected tissues and healthy tissues within the patient. The images are also useful for radiotherapy treatment or planning or for surgical planning. Several modalities are used to generate images or functionality of anatomy of a patient which are suitable for diagnostic purposes or for therapy or surgical planning. Examples include conventional X-ray imaging, computed tomography (CT) imaging, magnetic resonance imaging (MRI) and nuclear medicine imaging techniques, such as positron emission tomography (PET) and single photon emission computer tomography (SPECT).

In the case of radiation treatment (RT) planning, CT imaging is generally used because image voxel gray values (measured in Hounsfield Units) can be used directly in the calculation of radiation dosage. Many of the current workflow and RT planning applications have been developed around CT imaging. However, a CT image's lack of soft tissue contrast creates ambiguous borders between organs, making it difficult for one to accurately contour organs on a CT image. Large inter-physician variability of manually segmented volumes has been observed. In addition, the precision of radiation therapy has evolved to a point such the uncertainty in segmentation has become the greatest source of error. For these reasons, demand for MR images acquired specifically for planning purposes is growing. There is also growing interest in applications that facilitate workflow with the MR images.

One such application is the automatic contouring of organs on MR images. Automatic segmentation is of extremely high importance in today's busy radiation therapy departments to achieve productivity requirements. Currently, clinicians (such as radiologists, dosimetrists or radiotherapists) must trace the outline of a few critical structures on a large number of images. Manually drawings the individual contours on a contiguous set of 2D slices and combining them to form 3D volumes is very time consuming and labor intensive. The time and labor increase significantly with the number of image slices in the image set, as well as the number and size of the organs, tumors, etc. in the anatomical area of interest. The quality of the contouring and the resulting 3D objects depend on the resolution and contrast of the 2D images and on the experience and judgment of the clinician performing the reconstruction. Automatic segmentation methods have been developed to address several of the problems with manual segmentation. However, automatic segmentation on MR images is more difficult than on CT images. Automatic segmentation of organs on MR images may be difficult because of the high inter-patient variability and the varying image quality.

It would be desirable to have an atlas-based system and method for automatically segmenting organs on MR images that provides improved performance including reliability and precision.

BRIEF DESCRIPTION OF THE INVENTION

In accordance with an embodiment, a method for segmenting organs on magnetic resonance (MR) images includes retrieving an MR image of a subject, generating a transformation matrix by segmenting bones on the MR image, generating an initial organ segmentation of the MR image by registering a combined organ and bone atlas with the MR image using the transformation matrix and displaying the MR image with initial organ segmentation on a display.

In accordance with another embodiment, a system for segmenting organs on magnetic resonance (MR) images, the system includes a storage comprising at least one set of MR images for at least one subject, an operator console configured to receive input information and display images and a processor coupled to the storage and the operator console, the processor programmed to retrieve an MR image of a subject, generate a transformation matrix by segmenting bones on the MR image, generate an initial organ segmentation of the MR image by registering a combined organ and bone atlas with the MR image using the transformation matrix and display the MR image with initial organ segmentation on a display.

In accordance with yet another embodiment, a non-transitory computer readable storage medium having a program for performing a method for segmenting organs on magnetic resonance (MR) images including program code for retrieving an MR image of a subject, program code for generating a transformation matrix by segmenting bones on the MR image, program code for generating an initial organ segmentation of the MR image by registering a combined organ and bone atlas with the MR image using the transformation matrix and program code for displaying the MR image with initial organ segmentation on a display.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
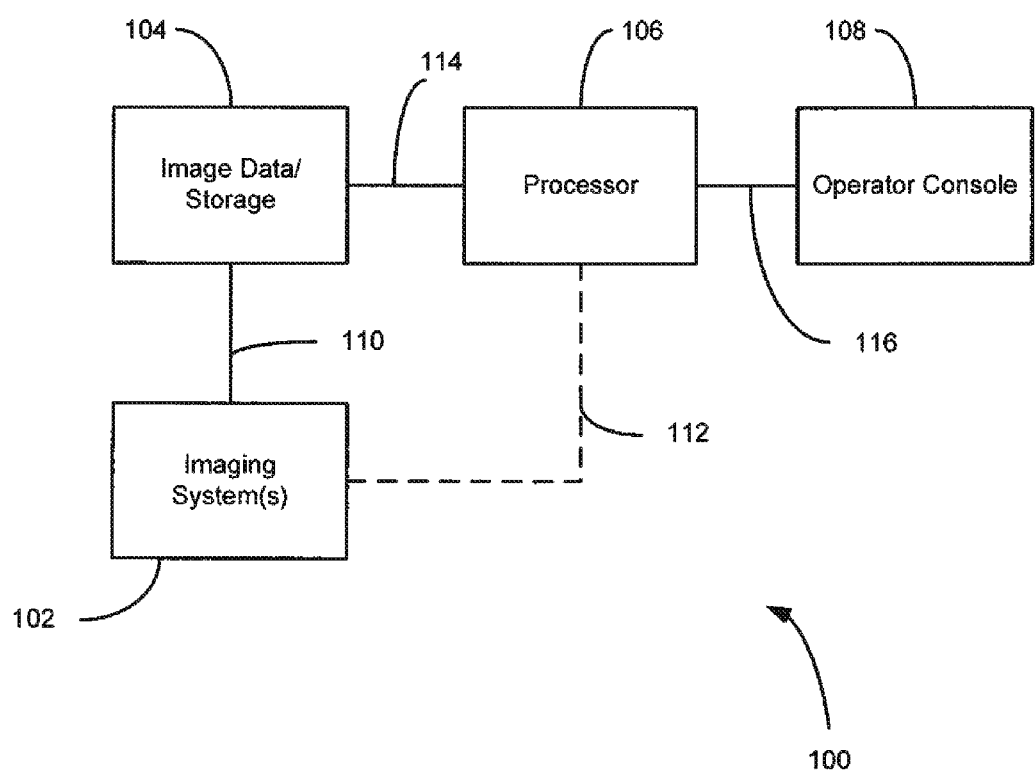
FIG. 1 is a schematic block diagram of a system for automatic segmentation of organs on MR images in accordance with an embodiment.

FIG. 1 is a schematic block diagram of a system for automatic segmentation of organs on MR images in accordance with an embodiment. In system 100, image data is stored in storage or memory 104. Storage 104 may be capable of storing sets of data or images generated by one or more imaging systems 102 or images and data generated using processor 106 and operator console 108. Storage 104 may, for example, be integrated into the imaging system 102 or processor 106 or may be remotely located and connected to the imaging system 102 and processor 106 through a network. Storage 104 may be for example, a PACS storage, an archival media device, permanent or back-up memory storage.

Images and image data may be generated by one or more imaging systems 102. Imaging system(s) 102 may be, for example, a computer tomography (CT) system, a magnetic resonance imaging (MRI) system, a conventional X-ray imaging system, or nuclear medicine imaging system such as positron emission tomography (PET) and single proton emission computer tomography (SPECT). Imaging system(s) 102 are configured to generate image data sets and images. The image data may be communicated through a link 110 to storage 104 or through a link 112 to the processor 106. Image data may also be communicated from storage 104 to the processor 106 though a link 114. Links 110, 112 and 114 may be direct wired links or may be fiber optic connections or wireless communication links or the like.

The image date may be further processed by processor 106 (as described further below) and conveyed to the operator console 108. Image data may be requested or retrieved by processor 106 from storage 104 or received by processor 106 from imaging system(s) 102. Processor 106 may be, for example, a central processing unit (CPU), a microprocessor, a microcontroller, and/or the like as known in the art. Processor 106 may be an integrated component or may be distributed across various locations. In one embodiment, processor 106 and operator console 108 may be part of an operator workstation. Processor 106 may be configured to perform or execute methods and control functions for well-known image processing techniques such as reconstruction, image data memory storage, segmentation and the like. In addition, processor 106, is configured to perform or execute a method for automatically segmenting organs on MR images as described below with reference to FIGS. 2-5.

Processor 106 is also coupled to and communicates with an operator console 108 via a link 116. Link 116 may be a direct wired link or may be a fiber optic connection or wireless communication link or the like. Operator console 108 provides an interface for an operator to, for example, display images, perform image processing on the images, archive data and images and control and/or monitor other functions of system 100. Operator console may include elements such as an input device, a control panel, and a display. The input device may include, a mouse, joystick, keyboard, track ball, touch activated screen, light wand, voice control, or any similar or equivalent input device. Processor 106 may be configured to receive input information from the operator console 108 and generating an output that may be displayed on a display of the operator console 108. Data, such as images, may be communicated through link 116 from processor 106 to operator console 108.

Figure 2:
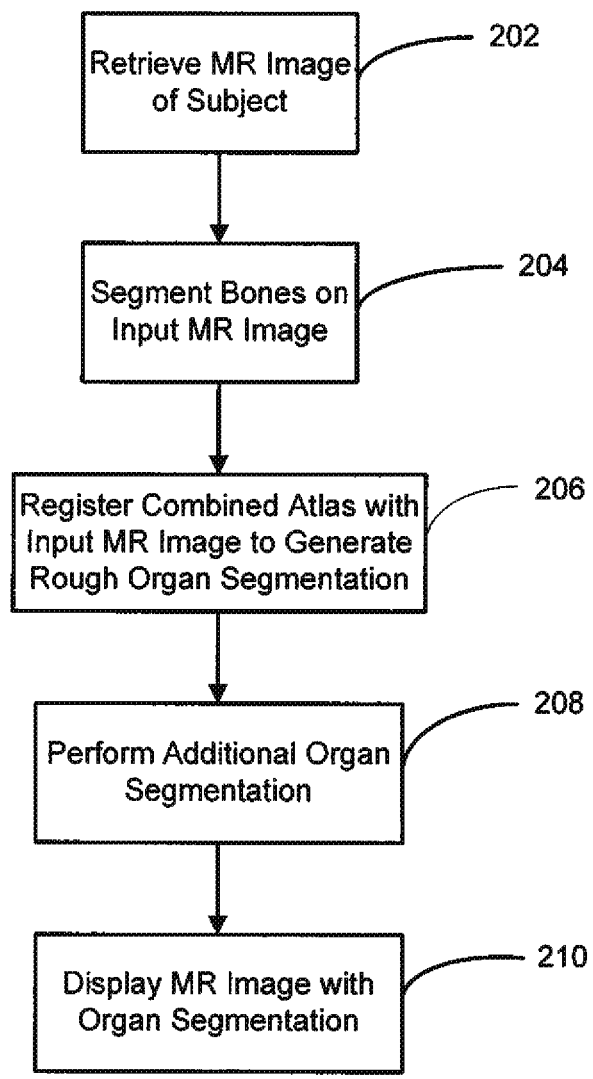
FIG. 2 illustrates a method for automatically segmenting organs in MR images in accordance with an embodiment.

FIG. 2 illustrates a method for automatically segmenting organs in MR images in accordance with an embodiment. The method may be implemented using a system such as described above with respect to FIG. 1 or any similar or equivalent system for segmenting images. At block 202, an MR image of a specific subject or patient (herein referred to as the "input MR image") is retrieved from storage or memory such as storage 104 shown in FIG. 1 or may be received from a MRI system. The input MR image may be generated using known MR imaging protocols. The selected input MR image is the image on which an organ or organ(s) will be segmented or contoured. At block 204, bone segmentation is performed on the input MR image to generate a bone segmented input MR image and a transformation matrix. In one embodiment, the input MR image is subjected to a bone enhancement process before the bone segmentation on the input MR image. The bone enhancement process may be one known in the art that enhances plate-like (e.g., bones) or bony structures. The bone segmentation locates bones on the input MR image and is used to compute a transformation matrix. Any know atlas registration based bone segmentation method that provides a transformation matrix may be used. In one embodiment, a CT based bone atlas is registered to the input MR image. In another embodiment, a combined bone and organ atlas (hereinafter referred to as the "combined atlas") is registered to the bones in the input MR image. A preferred method for generating a combined bone and organ atlas is described further below with respect to FIG. 3.

At block 206, the combined atlas is registered to the organs in the input MR image using the transformation matrix (generated at block 204). The atlas registration generates a rough organ segmentation and organ localization on the input MR image. In particular, the registration transformation computed at block 204 is applied to the organs in the combined atlas and results in an initial localization and rough segmentation of the organs on the input MR image. In an embodiment, bounding boxes may be provided around each organ which can be used to select a region of interest for subsequent organ segmentation. A registration method known in the art may be used to register the combine atlas to the input MR image. At block 208, additional organ segmentation (e.g., precise, organ specific segmentation) may be performed on the input MR image to provide fine segmentation of particular organs. Various known organ segmentation methods may be used to fine tune the contour and segmentation of specific organs for the subject. In one embodiment, the probability information from the combined atlas may be used by the operator with the image gradient information to determine if the contour should be accepted as the segmentation. In another embodiment, a conventional segmentation method is applied which uses the combined atlas to provide seed points. The conventional segmentation method may also be used to prevent the region growing from going out of organ boundaries. In yet another embodiment, a combination of these methods may be used where the gradient of the organ and the probability information from the combined atlas is used to construct a feature image.

At block 210, the MR image with organ segmentation may be displayed, for example, using a display of an operator console as described above with respect to FIG. 1. In an embodiment, the MR image with organ segmentation may also be stored in, for example, storage 104 shown in FIG. 1. The segmented and contoured organ(s) on the input MR image may be used for applications such as radiation therapy or quantitative measurements.

Figure 3:
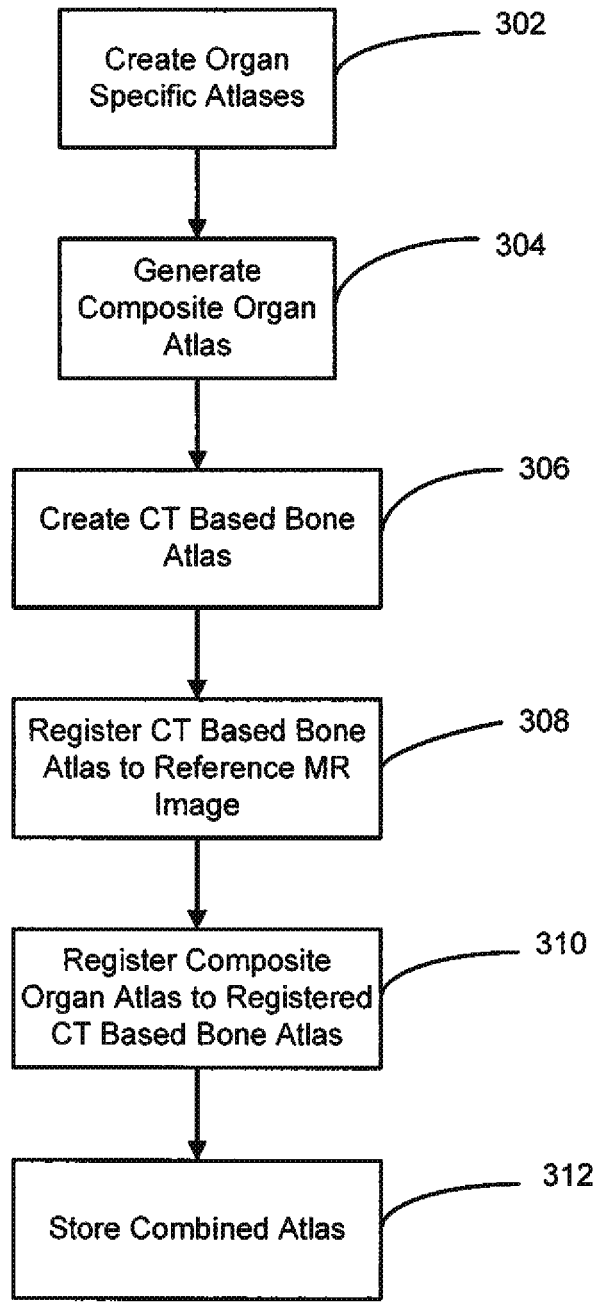
FIG. 3 illustrates a method for creating a combined bone and organ atlas in accordance with an embodiment.
Figure 4:
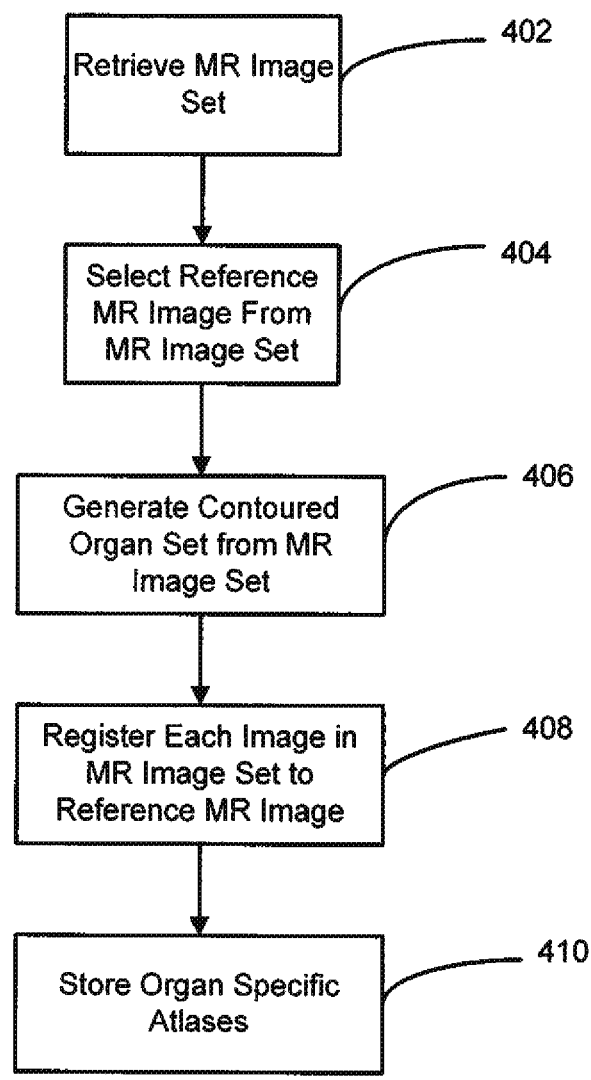
FIG. 4 illustrates a method for generating a set or organ specific atlases in accordance with an embodiment.
Figure 5:
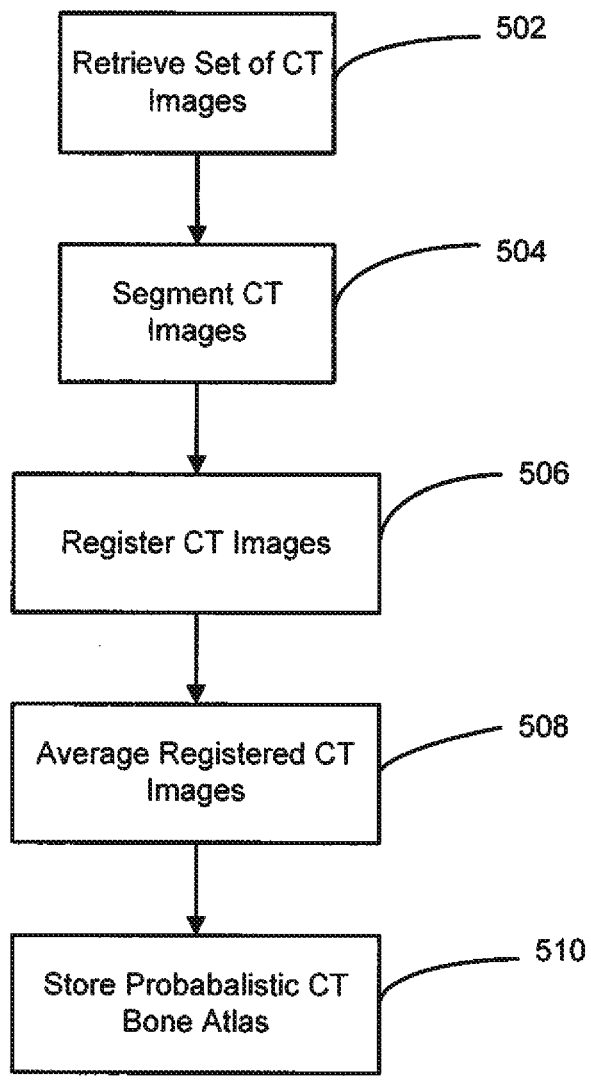
FIG. 5 illustrates a method for generating a probabilistic CT bone atlas in accordance with an embodiment.

As mentioned, a combined atlas is used in the organ segmentation method described above with respect to FIG. 2. FIG. 3 illustrates a method for creating a combined bone and organ atlas in accordance with an embodiment. At block 302, a set of organ atlases is created. In an embodiment, the set of organ atlases are probabilistic organ atlases and an atlas is created for each organ at risk. FIG. 4 illustrates a method for generating a set of organ specific atlases in accordance with an embodiment. At block 402, an MR image set is selected to use in organ atlas creation. At block 404, one MR image from the selected MR image set is elected as a reference MR image. The reference MR image is selected based on criteria such as good image quality, ease of bone segmentation and representation of average patient anatomy. One advantage of using a single reference MR image is that all of the image information (e.g., intensity, edges, etc.) is available without the unavoidable blurring effect of averaging. The remaining MR images in the MR image set are manually contoured for organs to create a contoured organ set. At block 408, each MR image in the contoured image set is registered to the reference MR image. In one embodiment the MR images in the contoured image set are first transformed to the coordinate system of the reference MR image using, for example, a resampling process. Then, two steps are used to register the MR images in the contoured image set to the reference MR image. First, a global registration method is used. For example, registration is performed using a landmark-based method. The landmarks are preferably the center of gravities of the organs. Second, the organs in the MR images of the contoured image set are registered to the reference MR image one-by-one through an automatic binary overlap based registration method. After registration at block 408, the result is a set of organ specific probability atlases that describe both the position/orientation and shape/size information of each organ individually. At block 410, the set of organ specific atlases is stored in, for example, storage or memory 104 as described above with respect to FIG. 1.

Returning to FIG. 3, at block 304 the organ specific atlases are fit together to represent the connection (e.g., distance, angle) between organs and to generate a composite organ atlas that contains all of the atlas information (e.g., in each spatial position, the organ atlas shows what is the probability that each organ is located there). At block 306, a CT based bone atlas is created. In an embodiment, the CT based bone atlas is a probabilistic bone atlas created from CT images using the method illustrated in FIG. 5. The method may be implemented using a system such as described above with respect to FIG. 1 or any similar or equivalent system. At block 502, a set of CT images is retrieved from storage or memory such as storage 104 shown in FIG. 1. The set of CT images includes images from multiple subjects and may be, for example, of the same type of bone. A bone segmentation is performed on the set of CT images at block 504 to generate a set of bone segmented CT images with segmented bone volumes. Bone segmentation methods known in the art may be used. In one embodiment, the bone segmentation method separates the voxels in the CT images by density using a predefined threshold value. For example, voxels with a density value above a threshold value (e.g., a threshold value between 300-500 Hounsfield units) may be assigned as bone in the images. In one embodiment, the threshold value is 400 Hounsfield units.

At block 506, the set of bone segmented CT images is registered. In an embodiment, an image from the set of CT images is selected as a reference CT image to which the remaining images are registered (or transformed). For example, the CT image with the largest dimension in the set of CT images may be selected as the reference CT image and the remaining bone segmented CT images in the set are transformed to the reference image (e.g., scaled to the image size of the reference image). The registration method may be one generally known in the art and may include rotation, translation and scaling of the segmented bone volumes of the CT images to the selected reference CT image. In one embodiment, for head CT images an initial rotation transformation should be applied because of the variability of head rotation around the x (left/right) axis. At block 508, the registered set of bone enhanced CT images are averaged using known methods to generate the probabilistic CT based bone atlas. The higher the number of CT images in the set of CT images, the better the reliability of the resulting probabilistic bone atlas. The CT based bone atlas is then at block 510 stored in, for example, storage or memory 104 as described above with respect to FIG. 1.

Returning to FIG. 3, at block 308, the CT based bone atlas is registered to the reference MR image to create a registered CT based bone atlas. After registration, the bone structures included in the registered CT based bone atlas overlap with the corresponding bone structures of the reference MR image. The registered CT based bone atlas provides information about where certain bone structures are located in the reference MR image. At block 310, the composite organ atlas is registered to the registered CT based bone atlas from block 308 to generate a combined and co-registered bone and organ atlas. At block 312, the combined atlas is stored in, for example, storage or memory 104 as described above with respect to FIG. 1. As mentioned, the combined atlas is used in the segmentation method described above with respect to FIG. 2.

Computer-executable instructions for automatic segmentation of organs on MR images according to the above-described method may be stored on a form of computer readable media. Computer readable media includes volatile and non-volatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which may be accessed by system 100 (shown in FIG. 1), including by internet or other computer network forms of access.

A technical effect of the disclosed method and apparatus is that it provides for a computer-implemented technique for automatically segmenting organs on MR images.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. The order and sequence of any process or method steps may be varied or re-sequenced according to alternative embodiments.

Many other changes and modifications may be made to the present invention without departing from the spirit thereof. The scope of these and other changes will become apparent from the appended claims.

We claim:
1. A method for segmenting organs on magnetic resonance (MR) images comprises:
retrieving an MR image of a subject;
generating a transformation matrix by segmenting bones on the MR image;

generating an initial organ segmentation and organ localization on the MR image by registering a combined organ and bone atlas with the MR image using the transformation matrix, wherein the combined organ and bone atlas includes an organ atlas registered to a bone atlas; and displaying the MR image with initial organ segmentation on a display.

2. A method according to claim 1, further comprising performing at least one additional organ segmentation on the MR image with the initial organ segmentation to provide a fine segmentation of a particular organ.

3. A method according to claim 1, wherein the combined organ and bone atlas is created using a CT based bone atlas combined and co-registered with a MR based organ atlas.

4. A method according to claim 1, wherein the bone atlas is a probabilistic bone atlas.

5. A method according to claim 4, wherein the MR organ atlas is a probabilistic organ atlas.

6. A method according to claim 3, wherein the MR based organ atlas is a composite organ atlas formed from a plurality of organ specific atlases.

7. A system for segmenting organs on magnetic resonance (MR) images, the system comprising:
- a storage comprising at least one set of MR images for at least one subject;
- an operator console configured to receive input information and display images; and
- a processor coupled to the storage and the operator console, the processor programmed to:
  - retrieve an MR image of a subject;
  - generate a transformation matrix by segmenting bones on the MR image;
  - generate an initial organ segmentation and organ localization on the MR image by registering a combined organ and bone atlas with the MR image using the transformation matrix, wherein the combined organ and bone atlas includes an organ atlas registered to a bone atlas; and
  - display the MR image with initial organ segmentation on a display.

8. A system according to claim 7, wherein the processor is further programmed to perform at least one additional organ segmentation on the MR image with the initial organ segmentation to provide a fine segmentation of a particular organ.

9. A system according to claim 7, wherein the combined organ and bone atlas is created using a CT based bone atlas combined and co-registered with a MR based organ atlas.

10. A system according to claim 7, wherein the organ atlas is a probabilistic organ atlas.

11. A system according to claim 9, wherein the MR based organ atlas is a composite organ atlas formed from a plurality of organ specific atlases.

12. A system according to claim 9, wherein the CT based bone atlas is created using CT images of multiple subjects.

13. A non-transitory computer readable storage medium having a program for performing a method for segmenting organs on magnetic resonance (MR) images, the computer readable storage medium comprising:
- program code for retrieving an MR image of a subject;
- program code for generating a transformation matrix by segmenting bones on the MR image;
- program code for generating an initial organ segmentation and organ localization on the MR image by registering a combined organ and bone atlas with the MR image using the transformation matrix, wherein the combined organ and bone atlas includes an organ atlas registered to a bone atlas; and
- program code for displaying the MR image with initial organ segmentation on a display.

14. A non-transitory computer readable medium according to claim 13, further comprising program code for performing at least one additional organ segmentation on the MR image with the initial organ segmentation to provide a fine segmentation of a particular organ.

15. A non-transitory computer readable medium according to claim 13, wherein the combined organ and bone atlas is created using a CT based bone atlas combined and co-registered with a MR based organ atlas.

16. A non-transitory computer readable medium according to claim 15, wherein the bone atlas is a probabilistic bone atlas.

17. A non-transitory computer readable medium according to claim 15, wherein the MR based organ atlas is a composite organ atlas formed from a plurality of organ specific atlases.

18. The method of claim 1, further comprising generating the organ atlas by fitting together organ specific atlases to represent connections between organs and to show probabilities that the organs are at select spatial positions.

19. The method of claim 1, wherein the organ atlas contains spatial positions, connections between organs, and probabilities that the organs are located at the spatial positions, the spatial positions and connections registered to the bone atlas.

20. The method of claim 1, wherein the organ atlas includes organ spatial positions and connections therebetween, wherein the bone atlas includes bone spatial positions and connections therebetween, the bone and organ spatial positions and connections co-registered with one another.

21. The system of claim 7, wherein the processor is programmed to generate the organ atlas by fitting together organ specific atlases to represent connections between organs and to show probabilities that the organs are at select spatial positions.

22. The system of claim 7, wherein the organ atlas contains spatial positions, connections between organs, and probabilities that the organs are located at the spatial positions, the spatial positions and connections registered to the bone atlas.

23. The system of claim 7, wherein the organ atlas includes organ spatial positions and connections therebetween, wherein the bone atlas includes bone spatial positions and connections therebetween, the bone and organ spatial positions and connections co-registered with one another.

24. The non-transitory computer readable medium of claim 13, further comprising program code to generate the organ atlas by fitting together organ specific atlases to represent connections between organs and to show probabilities that the organs are at select spatial positions.

25. The non-transitory computer readable medium of claim 13, wherein the organ atlas contains spatial positions, connections between organs, and probabilities that the organs are located at the spatial positions, the spatial positions and connections registered to the bone atlas.

26. The non-transitory computer readable medium of claim 13, wherein the organ atlas includes organ spatial positions and connections therebetween, wherein the bone atlas includes bone spatial positions and connections therebetween, the bone and organ spatial positions and connections co-registered with one another.

* * * * *